C. R. MILLER.
GREASE GUN.
APPLICATION FILED DEC. 22, 1919.
Reissued Mar. 16, 1920.
14,819.
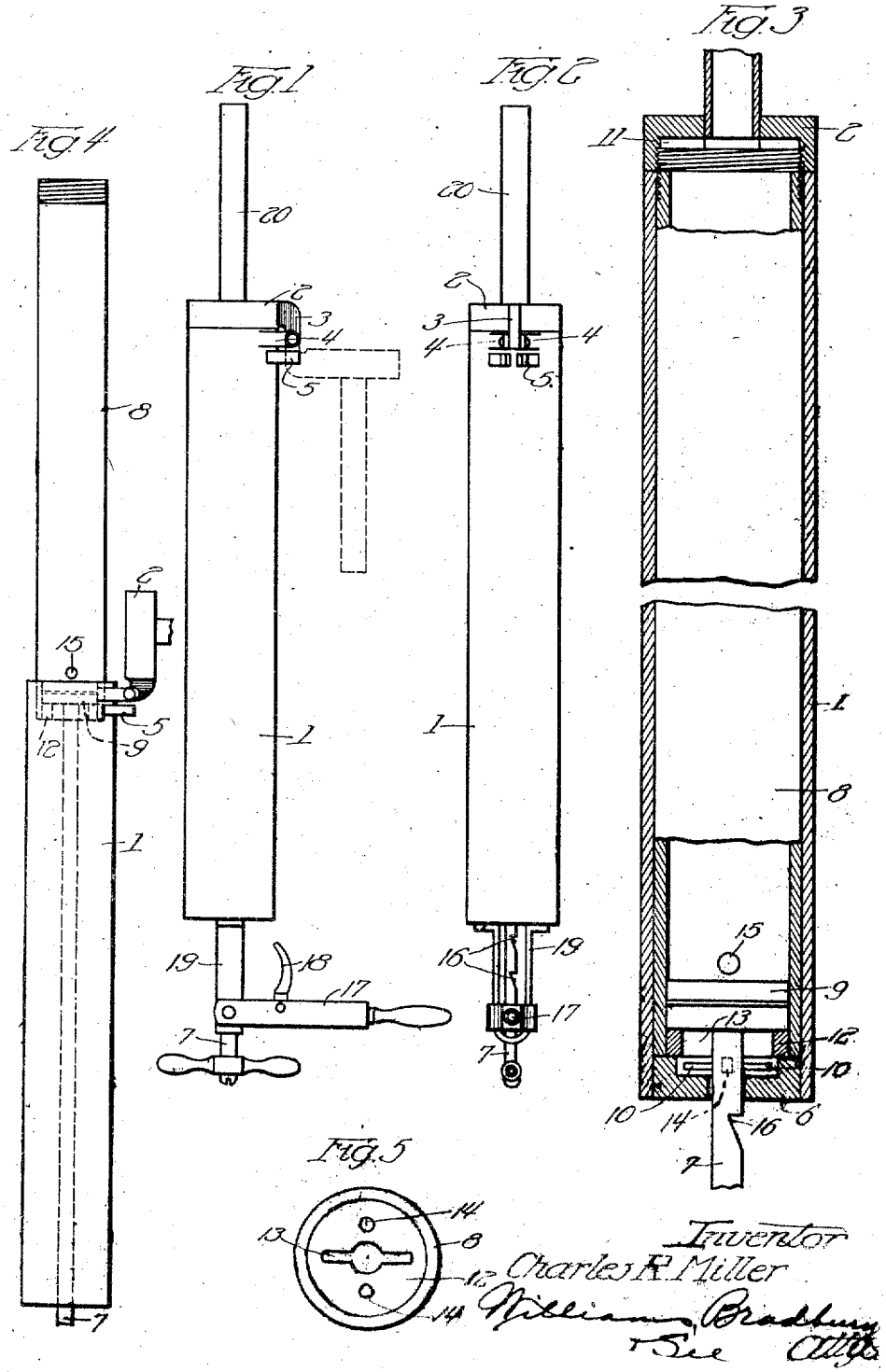
Inventor
Charles R. Miller
William Bradbury
Sec Atty

UNITED STATES PATENT OFFICE.

CHARLES R. MILLER, OF COLLINSVILLE, TEXAS, ASSIGNOR TO MAYO-SKINNER MANUFACTURING CO., OF CHICAGO, ILLINOIS, A CORPORATION OF ILLINOIS.

GREASE-GUN.

14,819. Specification of Reissued Letters Patent. Reissued Mar. 16, 1920.

Original No. 1,285,776, dated November 26, 1918, Serial No. 251,631, filed August 27, 1918. Application for reissue filed December 22, 1919. Serial No. 346,789.

*To all whom it may concern:*

Be it known that I, CHARLES R. MILLER, a citizen of the United States of America, residing at Collinsville, in the county of Grayson and State of Texas, have invented certain new and useful Improvements in Grease-Guns, of which the following is a full, clear, concise, and exact description, reference being had to the accompanying drawings, forming a part of this specification.

My invention relates to devices for handling grease for various kinds of machinery and more particularly to grease guns. Generally stated, my invention is concerned with the provision of a simple device which can be easily filled with grease and by means of which the grease can be readily applied wherever required. One object of my invention is to provide a grease gun so constructed and arranged that grease may be taken into the grease containing tube of the grease gun easily and quickly without getting any of the grease on the hands.

Other objects and advantages will be fully explained in the following description and the invention will be more particularly pointed out in the claims.

Reference is had to the accompany drawings which form a part of this application.

Figure 1 is a side elevation of the grease gun.

Fig. 2 is a side elevation, this view showing the gun turned one quarter around from the position shown in Fig. 1.

Fig. 3 is a broken sectional view, showing details of construction and showing the parts enlarged.

Fig. 4 illustrates the position of the filler in the act of taking in a charge of grease, parts of the operating mechanism being omitted.

Fig. 5 is an end view of the telescopic filler.

Similar characters of reference are used to indicate the same parts throughout the several views.

The gun includes a barrel or outer sleeve 1 which is closed at the intake end by a cap 2 which is hingedly connected thereto, the hinge member including a shank 3 and jaw members 4 secured to the outside of the barrel and a pivot bolt. A spring clamp 5 is provided for holding the cap 2 open during a filling operation. When the cap is pushed open to the position shown by dotted outline in Fig. 1 the shank 3 will be caught by the spring clamping members 5.

That end of the barrel or sleeve 1 opposite the cap 2, as shown in the accompanying drawings, is closed by a plug 6 which serves as a guide for the plunger rod 7 and for other purposes hereinafter explained. A telescopic filler tube or inner sleeve 8 is mounted in the barrel 1 and is movable therein, both rotatably and reciprocally. I prefer to manipulate the filler or inner sleeve by the plunger 9 and its rod 7, which is provided with lugs 10 for this purpose.

The cap 2 has internal threads and the filler or inner sleeve 8 is provided with threads for engaging the cap for locking the cap closed and for holding the inner and outer sleeves in proper position with respect to each other. The cap 2 is provided with a packing gasket 11 against which the filler tube or inner sleeve presses. The filler or inner sleeve is also provided with a perforated plug 12 by which the said filler or inner sleeve 8 may be actuated.

The plunger 9 operates within the tube 8 for discharging grease as hereinafter explained. The plug 12 has a slot 13 which is enlarged in the central part for the operation of the plunger rod 7. The slot 13 is for the passage of the lugs 10 when the plunger 9 is to be released from the tube 8. When the lugs 10 are at right angles to the slot 13, the tube 8 can be moved by the plunger rod 7 and by the plunger 9. The plug 12 has downwardly projecting lugs 14 rigid therewith. For filling the tube 8 with grease, the rod 7 will be turned and the lugs 10 will engage the lugs 14 and thus unscrew the tube 8 from the cap 2. The cap 2 can then be swung to the dotted outline position of Fig. 1 and clamped in this position. The rod 7 by means of the lugs 10 is used to push the tube 8 to the position shown in Fig. 4 for filling purpose. The tube 8 is provided with an opening 15 to permit escape of air during a filling operation. When the tube 8 goes back into the barrel 1, the perforation 15 will be closed by the wall of the barrel 1. When the tube 8 has been filled, it is drawn back within the barrel 1 by means of the plunger 9. Thus the filler tube 8 is actuated by the plunger rod 7 with the plunger 9 and the lugs 10, and the tube 8 is released from the cap 2 by means of the plunger rod 7 and the lugs 10 and the lugs 14 on the plug 12.

For discharging the grease, the plunger 9 can be released from the tube 8 by turning the plunger rod 7 until the lugs 10 will pass through the slot 13 and then pushing the rod 7 inwardly. The rod 7 can then be actuated manually or by ratchet mechanism. Notches 16 are cut in the side of the rod 7. A handle 17 is pivotally mounted on a bracket 19 which is rigid with the barrel 1 and provided with a swinging gravity dog 18 which is adapted to engage the notches 16, the notches 16 constituting ratchet teeth, or a rack. The grease is forced out of a discharge spout or nozzle 20.

When the tube 8 is to be filled with grease, it is pushed out of the barrel 1, as above described, and then immersed in the grease for taking in a charge. It is then drawn back within the barrel by means of the plunger 9, as above described, and then screwed into the cap 2 for locking the cap and tube 8 together and for locking the cap 2 to the barrel 1.

When the tube 8 is drawn back, as just explained, any excess grease clinging to its outer cylindrical surface is stripped therefrom by the barrel or outer sleeve 1. Moreover since the barrel or outer sleeve 1 lies around that portion of the filler tube or inner sleeve 1 which is immersed in the grease during the filling operation, it will be seen that after the filling operation has been accomplished and the parts restored to normal position, there will be no chance for the user to get grease on his hands in manipulating the grease gun.

Various changes in the sizes, proportions and construction of the several parts may be made without departing from my invention.

What I claim is:—

1. A grease gun comprising a barrel, a telescopic filling and dispensing member mounted in said barrel, a cap hingedly connected to said barrel, and a plunger detachably connected to said filling member for operating the same and provided with means for attaching and detaching said filling member to and from said cap.

2. A grease gun comprising a barrel, a telescopic filling and dispensing member mounted in said barrel provided with a perforated plug and lugs depending from the plug, a cap hingedly connected to said barrel, and a plunger detachably connected to said filling member for actuating the same and provided with lugs for engaging the lugs of said plug for attaching and detaching said filling member to and from said cap.

3. A grease gun comprising a barrel, a filling and dispensing member mounted in said barrel, a cap hingedly connected to said barrel, a barrel plug rigid with said barrel having an interior cavity and a perforation therethrough, a perforated plug rigid with said filling member provided with depending lugs, and a plunger detachably connected to said filling member and provided with horizontal lugs adapted to engage said depending lugs for attaching and detaching said filling member to and from said cap.

4. A grease gun comprising a barrel, a cap hingedly connected to said barrel and means on said barrel for holding said cap in open position, a telescopic filling member mounted in said barrel, and a plunger detachably connected to said filling member for moving the same in and out of said barrel and provided with means for attaching and detaching said filling member to and from said cap.

5. A grease gun provided with a cap hingedly connected thereto and provided with a discharge nozzle, a telescopic filling member mounted in said barrel, a plunger detachably connected to said filling member for moving the same in and out of said barrel and provided with means for detaching and attaching said filling member from and to said cap, and means for actuating said plunger to discharge grease through said nozzle when detached from said filling member.

6. A grease gun comprising a grease container, a plunger movable therein, a sleeve disposed around said grease container, a cap hingedly mounted on said sleeve, a nozzle carried by said cap, internal screw threads provided in said cap, and external screw threads on said container, arranged to co-operate with said first mentioned threads, said grease container being rotatable in said sleeve to effect the engagement and disengagement of said threads, and being reciprocable relatively to said sleeve so that the threaded end of the container may be moved out of the corresponding end of the sleeve for the purpose of filling said container, said cap serving to prevent relative reciprocatory movement between said grease container and sleeve when said container has threaded engagement with said cap.

7. A grease gun comprising a cylindrical grease container and a plunger reciprocable therein, a cylindrical sleeve around said grease container, a cap hingedly mounted upon one end of said sleeve, said cap having its pivot point outside of the circle defined by the outer cylindrical surface of said sleeve, to the end that said cap may swing clear of the end of the sleeve to permit the grease container to be forced out of the sleeve, said grease container and said cap being provided with coöperating screw threads, said grease container being rotatable in said sleeve to effect the engagement and disengagement of said threads and being reciprocable relatively to said sleeve so that the container may be forced a substantial distance out of the sleeve for the purpose of filling the container, said cap serving to prevent relative reciprocatory movement between said grease container and said sleeve when said container has threaded engagement with said cap.

8. A grease gun comprising a sleeve, a telescopic filling and dispensing member mounted in said sleeve, a plunger in said filling and dispensing member for the purpose of discharging grease from one end thereof, said filling and dispensing member being reciprocable relatively to said sleeve so that the discharge end of said filling and dispensing member may be moved a substantial distance out of the corresponding end of the sleeve for the purpose of filling said filling and dispensing member with grease, a cap fitted over that end of said sleeve which is adjacent to the discharge end of said filling and dispensing member, together with means for detachably securing the discharge end of said filling and dispensing member to said cap.

9. A grease gun comprising a tube that is adapted to be filled with grease by immersing its discharge end in a supply of grease, a sleeve which normally sheaths that portion of the tube which is immersed in the grease during the filling operation, said sleeve being reciprocable relatively to said tube to expose a substantial portion of the tube to be immersed in the grease during the filling operation, and means for holding said sleeve in position to sheath said portion of said tube comprising a cap carried by said sleeve, said cap arranged to be detachably secured to said tube.

10. A grease gun comprising a grease container that is adapted to be filled with grease by forcing its discharge end into a supply of grease, a nozzled cap for the discharge end of said container, and a sleeve disposed around said container and snugly fitting the same, said sleeve being rotatable and reciprocable with respect to said container, means pivotally securing said cap to said sleeve and means for detachably securing said cap to the discharge end of said grease container, said sleeve arranged to be moved back from the discharge end of said container when the container is to be forced into a supply of grease as aforesaid and being movable toward the discharge end of said container to strip excess grease from its outer surface, after said container has been filled with grease.

11. A grease gun comprising an outer sleeve, a telescopic filling and dispensing member mounted within said outer sleeve and adapted to be rotated and reciprocated therein, a plunger in said filling and dispensing member, a nozzled cap hingedly mounted upon the sleeve and arranged to close one end of the latter, together with cooperating screw threads carried by the cap and said filling and dispensing member, whereby said member may have threaded engagement with said cap to retain said cap in position and to prevent relative axial movement between said sleeve and said filling and dispensing member.

12. A grease gun comprising a grease container, a plunger movable therein, a sleeve disposed around said grease container, a nozzled cap hingedly mounted upon the sleeve and arranged to fit over one end of the latter, internal screw threads in said cap, external screw threads on said grease container whereby said grease container may be threaded into said cap to hold the cap in position and to prevent relative axial movement between the sleeve and the grease container, together with a packing gasket disposed in said cap and adapted to be compressed between the cap and grease container when the latter is threaded into the cap.

In witness whereof, I hereunto subscribe my name this 16th day of December, 1919.

CHARLES R. MILLER

Witnesses:
F. R. de Cordova,
Wm. H. Naylor.